(12) United States Patent
Ha et al.

(10) Patent No.: US 6,804,066 B1
(45) Date of Patent: Oct. 12, 2004

(54) COMPACT LENS ASSEMBLY FOR THE TELEPORTAL AUGMENTED REALITY SYSTEM

(75) Inventors: Yonggang Ha, Orlando, FL (US); Jannick Rolland, Chuluota, FL (US)

(73) Assignee: University of Central Florida, Orlando, FL (US)

( * ) Notice: Subject to any disclaimer, the term of this patent is extended or adjusted under 35 U.S.C. 154(b) by 2 days.

(21) Appl. No.: 10/285,855

(22) Filed: Nov. 1, 2002

Related U.S. Application Data

(63) Continuation-in-part of application No. 10/090,070, filed on Mar. 1, 2002.
(60) Provisional application No. 60/292,942, filed on May 23, 2001.

(51) Int. Cl.[7] .............................................. G02B 9/34
(52) U.S. Cl. ..................... 359/771; 359/683; 359/754
(58) Field of Search ............................... 359/682, 686, 359/688, 689, 690, 683, 676, 756, 754, 757–795, 566

(56) References Cited

U.S. PATENT DOCUMENTS

| | | | |
|---|---|---|---|
| 4,669,810 A | 6/1987 | Wood | 340/908 |
| 4,753,522 A | 6/1988 | Nishina et al. | 359/775 |
| 4,863,251 A | 9/1989 | Herloski et al. | 359/778 |
| 5,172,272 A | 12/1992 | Aoki | 359/654 |
| 5,172,275 A | 12/1992 | DeJager | 359/755 |
| 5,526,183 A | 6/1996 | Chen | 359/629 |
| 5,621,572 A | 4/1997 | Fergason | 359/630 |
| 5,625,495 A | 4/1997 | Moskovich | 359/663 |
| 5,818,632 A | 10/1998 | Stephenson | 359/565 |
| 6,028,606 A | 2/2000 | Kolb et al. | 345/419 |
| 6,198,577 B1 | 3/2001 | Kedar et al. | 359/663 |
| 6,271,972 B1 | 8/2001 | Kedar et al. | 359/663 |
| 6,301,062 B1 * | 10/2001 | Ohmori et al. | 359/733 |
| 6,404,562 B1 * | 6/2002 | Ota et al. | 359/692 |

OTHER PUBLICATIONS

"An Ultra–Light and Compact Design and Implementation of Head–Mounted Projective Displays," Yonggang Ha, et al., 2001, pp. 175–182.
"Innovative Diffractive Eyepiece for Helmet–Mounted Display," J. Bunkenburg, Jul. 1998, pp. 41–49.
"Diffractive Apochromatic Double–Gauss Lens" Hideki Ogawa, Jul. 1999, pp. 43–45.

* cited by examiner

Primary Examiner—Georgia Epps
Assistant Examiner—M. Hasan
(74) Attorney, Agent, or Firm—Brian S. Steinberger; Law Offices of Brian S. Steinberger, P.A.

(57) ABSTRACT

The projection lens system is designed for the head mounted projective display (HMPD) system to provide a wide field of view up to seventy degrees. The lens is optimized from a double-Gauss lens composed of two singlet lenses, one diffractive optical element (DOE) lens, one aspheric lens and a stop surface in the middle of the lens said lens has a focal length as low as approximately 23.9 mm whereby it has a field of view (FOV) of up to approximately 70 degrees and more. The lens can be combined with an additional field lens whereby the resulting lens combination provides improved image quality and/or field of view beyond approximately 70 degrees.

23 Claims, 8 Drawing Sheets

COMPACT LENS ASSEMBLY FOR THE TELEPORTAL AUGMENTED REALITY SYSTEM

This invention is a continuation-in-part (CIP) of U.S. patent application Ser. No. 10/090,070 filed Mar. 1, 2002, which claims the benefit of priority to U.S. Provisional Application Ser. No. 60/292,942 filed May 23, 2001, and relates to a lens assembly, and in particular to a compact lens assembly having an enhanced field of view (FOV) for a teleportal augmented reality system and this invention was funded in part by grant number N000140210261 awarded by the Office of Naval Research.

BACKGROUND AND PRIOR ART

Networked virtual environments allow users at remote locations to use a telecommunication link to coordinate work and social interaction. Teleconferencing systems and virtual environments that use 3D computer graphic displays and digital video recording systems allow remote users to interact with each other, to view virtual work objects such as text, engineering models, medical models, play environments and other forms of digital data, and to view each other's physical environment.

A number of teleconferencing technologies support collaborative virtual environments which allow interaction between individuals in local and remote sites. For example, video-teleconferencing systems use simple video screens and wide screen displays to allow interaction between individuals in local and remote sites. However, wide screen displays are disadvantageous because virtual 3D objects presented on the screen are not blended into the environment of the room of the users. In such an environment, local users cannot have a virtual object between them. This problem applies to representation of remote users as well. The location of the remote participants cannot be anywhere in the room or the space around the user, but is restricted to the screen.

Head-mounted displays (HMDs) have been widely used for 3D visualization tasks such as surgical planning, medical training, or engineering design. The main issues of the conventional eyepiece-based HMD technology include tradeoffs between resolution and field-of-view (FOV), and between compactness and eye clearance, the presence of large distortion for wide FOV designs, the conflict of accommodation and convergence, the occlusion contradiction between virtual and real objects, the challenge of highly precise registration, and often the brightness conflict with bright background illumination. The concept of head-mounted projective displays (HMPDs) is an emerging technology that can be thought to lie on the boundary of conventional HMDs, and projective displays such as the CAVE technology.

The basic HMPD concept of projection head-mounted display was first patented by Fisher Nov. 5, 1996, a U.S. Pat. No. 5,572,229.

Also a first international presentation was done by Kijima and Ojika in 1997 [See Kijima and Ojika, "Transition between virtual environment and workstation environment with projective head-mounted display." Proceedings of IEEE 1997 Virtual Reality Annual International Symposium, IEEE Comput. Soc. Press. 1997, pp.130–7. Los Alamitos, Ca., USA.].

Also on Apr. 15, 1997, a U.S. Pat. No. 5,621,572 was also issued to Fergason on the conceptual idea of a display, i.e. optical, system for head mounted display using retro-reflector and method of displaying an image.

Independently, the technology of HPMD was developed by Parsons and Rolland as a tool for medical visualization [See Parsons and Rolland, "A non-intrusive display technique for providing real-time data within a surgeons critical area of interest. "Proceedings of Medicine Meets Virtual Reality 98, 1998, pp.246–251"]. After the initial proof of concept using off-the-shelf components, a first-generation custom-designed HMPD prototype was built to investigate perception issues and quantify some of the properties and behaviors of the retro-reflective materials in imaging systems. Since, the projection system of the first-generation prototype was custom designed using a double-Gauss lens structure and built from commercially available components. The total weight of each lens assembly was about 50 grams (already a significant reduction compared to using off-the-shelf optics) with mechanical dimensions of 35 mm in length by 43 mm in diameter.

Common to all these teleconferencing systems is the use of lenses of various configurations and weights with distortions, lack of clarity and smearing of the televised images. Representative of lenses that might at first glance appear to be useful in the teleconferencing systems are also shown in:

U.S. Pat. No. 5,526,183 by Chen who teaches the use of a lens combining diffractive elements of both glass and plastic to reduce the weight and size of the lens within a conventional helmet mounted display rather than the necessary projective helmet mounted display;

U.S. Pat. No. 5,173,272 by Aoki which discloses a four element high aperture lens with glass elements making it too heavy for helmet mounting;

U.S. Pat. No. 4,753,522 by Nishina et al which lens features all 4 plastic elements and is fully symmetrical which latter property is imposed by its restricted application—a copy machine lens; and, U.S. Pat. No. 4,669,810 by Wood which shows a head-mounted display with many (more than 4) optical elements in the relay optics.

Consequently, there is a need for an augmented reality display that mitigates the above mentioned disadvantages (in part by an improved compact optical lens that provides visible spectrum images without smears and of reduced weight) and has the capability to display virtual objects and environments, superimposes virtual objects on the "real world" scenes, provides "face-to-face" recording and display, be used in various ambient lighting environments, and corrects for optical distortion, while minimizing computational power and time. Lightweight, compactness and enhanced field of view are always of basic importance and/or highly desirable for lens applications and particularly for head-mounted devices.

SUMMARY OF THE INVENTION

The first object of the present invention is to provide a compact lens of increased field of view over currently known lens.

The second object of this invention is to provide a compact lens assembly for HMPD with a field of view substantially greater than 50 degrees which can include up to approximately 70 degrees and more.

The third object of this invention is to provide a compact lens assembly with a field of view of about seventy degrees which is useful for a teleportal augmented reality system.

The fourth object of this invention is to provide a stereoscopic projection system with compact, projective optical lenses at the heart of the imaging which lenses have a field of view much greater than 50 degrees.

A preferred embodiment of the invention encompasses a compact lens assembly comprising in cross-section: a positive (convex-concave) singlet lens; a plastic singlet lens having one of its faces an aspheric substrate plus a diffractive optical surface; a mid-located stop/shutter; a plastic singlet negative lens with a aspheric surface on one of the faces; a glass singlet lens; and, said lens having a focal length less than about 35 mm whereby its field of view (FOV) is greater than about fifty degrees, which can include about 70 degrees or more, and the combination of the plastic and glass lens allows for visible spectrum images without color smear, while the plastic/glass combination allows for reduced overall weight; and to a method of forming a compact lens display assembly comprising the steps of: combining aspheric negative lenses with positive lenses; combining said combined lens with additional diffractive optics; and, further combining said combined lens with an additional field lens whereby full combination provides improved image quality.

Further objects and advantages of this invention will be apparent from the following detailed description of presently preferred embodiments which are illustrated schematically in the accompanying drawings.

DESCRIPTION OF THE PREFERRED EMBODIMENTS

Before explaining the disclosed embodiments of the present invention in detail, it is to be understood that the invention is not limited in its applications to the details of the particular arrangements shown since the invention is capable of other embodiments. Also, the terminology used herein is for the purpose of description and not of limitation.

It would be useful to discuss the meanings of some words used herein and their applications before discussing the compact lens assembly of the invention including:

HMPD—helmet mounted projection display;

Singlet—single lens element;

EFL—effective focal length;

$F^{\#}$—f-number;

OAL—overall length;

FOV—field of view (given in degrees for the diagonal of the display);

EPD—entrance pupil diameter;

AMLCD—active matrix liquid crystal display;

DOE—diffractive optical element; and,

MTF—modulation transfer function.

In copending U.S. patent application Ser. No. 10/090,070 filed Mar. 1,2002 of common assignee with the instant Application and fully incorporated herein by reference thereto, the double-Gauss lens disclosed therein has a FOV of about 52 degrees with an effective focal length of 35 mm.

Figure 1:
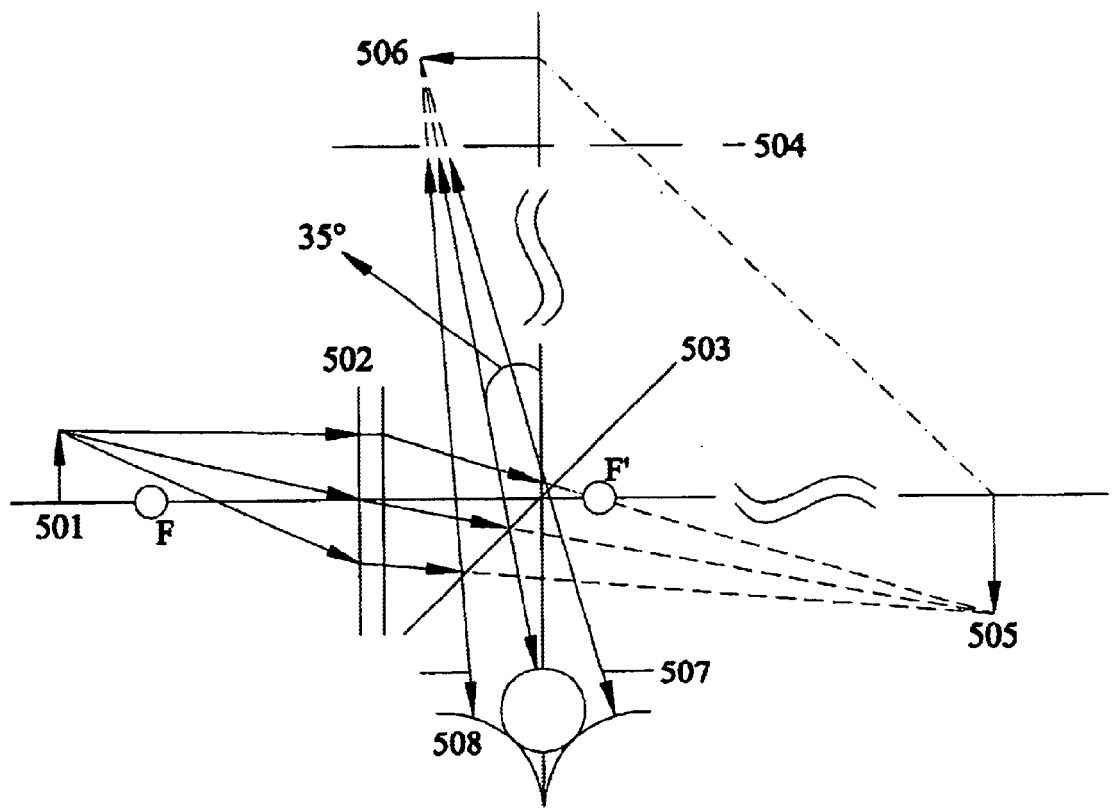
FIG. 1 is an illustrative top cross-sectional view of a projection head-mounted display where the novel compact lens having a seventy degree FOV can be used.

Referring now to FIG. 1 of the instant Application, there is seen in the concept of HMPD, a miniature display 501, located beyond the focal point of a projection lens 502, is used to display a computer-generated image. Through the projection lens 502, an intermediary image 505 is formed at the conjugate location. A beamsplitter 503 is placed after the projection lens at 45 degrees with respect to the optical axis to bend the rays at 90 degrees; therefore, mirror image 506 of intermediary image 505 is projected symmetrically. Meanwhile, phase conjugate optical material such as but not limited to retro-reflective screen 504 is placed either side of the projected image 506 (the screen is in front of the projected image in the figure case) so that rays hitting the surface are reflected back upon themselves in the opposite direction and travel through the beamsplitter 503. As a result, the user's eye 508 will perceive the projected image 506 from the exit pupil 507 of the optical system.

In the earlier referenced copending U.S. patent application Ser. No. 10/090,070 filed Mar. 1, 2002 of common assignee with the instant Application, the double-Gauss projection lens disclosed therein for HMPD use has a FOV of about 52 degrees with an effective focal length of 35 mm.

Figure 2:
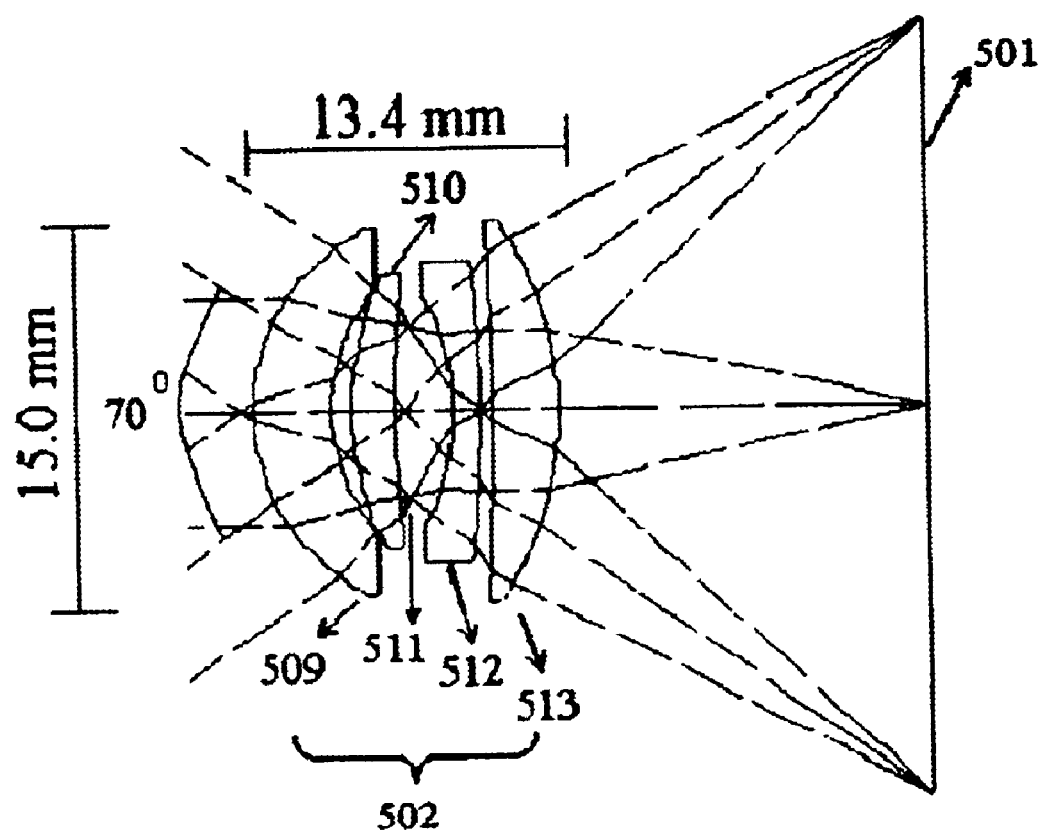
FIG. 2 shows the cross-sectional layout of the novel double-Gauss lens of the invention.

Reference should now be made to FIG. 2 of this Application for the cross-sectional layout of the novel double-Gauss lens of the invention which has been custom-designed and found to have an exceptional increase in its FOV. The lens 502 is composed of two glass singlet lenses, 509 and 513 respectively, two plastic singlet lenses, 510 and 512 respectively, with a stop surface 511 positioned between the glass-plastic and plastic-glass combinations. In particular, the second surface of plastic singlet lens 510 is designed with a diffractive optical element (DOE) on top of an aspheric substrate, and the first surface of plastic singlet 512 is an aspherical surface. Such a novel design makes it possible to achieve compactness, ultralight-weight, as well as improved performance.

The specification of the preferred compact lens system of the invention is and has been found to have the following characteristics:

EFL=23.92 mm; $F^{\#}$=2.39; OAL=13.36 mm; FOV=70.0°; EPD=10 mm; weight=6.0 g

Overall Specifications

Considering a monocular configuration, the optical image source of an HMPD is a miniature display and its image is formed in visual space via a projective system and a flat combiner. When using a flat combiner (i.e. beam splitter), only the projection optics needs to be designed. The miniature display selected based on availability and cost was approximately 1.3" backlighting color AMLCDs (purchased from Nvis Inc.) with approximately (640*3)*480 pixels and approximately 42-um pixel size. Given the miniature display, wide field-of-view (FOV) and high resolution are always two contradictory but desirable requirements. Besides the consideration of resolution, there are two aspects of limitation on the targeted FOV. One is that using a flat beam splitter gives a maximum FOV of approximately 90 degrees. The other is the fact that the significant retro-reflectivity drop-off of available retro-reflective materials beyond approximately +/−35 degrees of incidence imposes an upper limit on FOV for a flat mural display to avoid non-uniform image luminance. For non-flat displays, such as curved displays, wider field of views can be achieved. The limitation is then that of the approximately 90 degrees imposed by the beam splitter. To maximize the FOV with a flat screen made of the available retro-reflective materials, a diagonal FOV of approximately 70 degrees has been chosen as the design target. Given the resolution of the flat panel display available for this design, a focal length of approximately 23.92 mm does provide a diagonal FOV of approximately 70 degrees.

In the design of visual instruments, especially binocular HMPD, it is necessary to allow the wearers to swivel their eyes in their sockets. This requirement is becoming more critical for a pupil-forming system like HMPD.

As a result, the exit pupil size is specified to be approximately 10 mm, though the diameter of the eye pupil is typically approximately 3–5 mm in the lighting conditions provided by HMPDs. This would allow a swivel of +/−25 degrees. without causing vignetting in the overall FOV with an approximately 3-mm eye pupil, as well as allow a tolerance of approximately +/−5 mm interpupilary distance (IPD) for different users in the case where IPD would not be set precisely. However for applications where accuracy of rendered depth is critical, the interpupilary distance between the two arms of the optics should be set to the IPD of the user, and the setting should be reflected in the computational model to display stereoscopic irnages. In terms of performance evaluation, approximately 10-mm and approximately 3-mm pupils have been assessed in object space and visual space, respectively, and later described in detail later.

An effective eye relief (eye clearance) of approximately 23 mm is required to allow for all types of eyeglasses. It is always a design constraint for eyepiece type of HMDs because the optics size and therefore its weight scales directly with the increase in FOV, but it is not a direct limitation in HMPD because the eye clearance can be adjusted to the required specification by simply adjusting the separation between the projection lens and the beam splitter.

Optical system aberrations may cause either a decrease in image sharpness or warping of the image, the later allowing computational or electronic correction. In conventional HMD designs, it is common to optimize the design with respect to the optical aberrations that cannot be compensated electronically or computationally. In the case of projection optics, the location of the pupil within the lens, as opposed to outside the lens, naturally calls for low distortion. Therefore, primary aberrations such as spherical aberrations, astigmatism, coma, and distortion can be minimized in HMPD. The optical specification of the novel projection lens is with its additional important properties is later summarized in Table 1.

A preferred embodiment of the novel ultra-light and compact configuration is disclosed herein.

An established effective way to design an ultra-light, compact, and high-quality lens is to use a combination of plastic components and diffractive optical elements (DOE) [See J. Bunkenburg and T. A. Fritz, "Innovative diffractive eyepiece for a helmet-mounted display," Proceedings of SPIE-the International Society for Optical Engineering, Vol. 3430, Jul. 1998. San Diego, Calif., USA. P41–49].

In the design configuration of large aperture projection systems, DOE may be applied to correct the secondary spectrum and residual spherical aberrations for apochromatic imaging, in place of using high-index lanthanum crown glasses. The advantages of using DOE over conventional refractive optics. lie in the capability of designing large aperture and lightweight optical elements, achieving aspheric-like aberration correction, obtaining achromatization in combination with refractive elements, eliminating the need for exotic materials, gaining performance over conventional systems, and significantly reducing system weight, complexity, and cost.

With these considerations for head-mounted applications, the goal was to achieve a four-element compact design with two glass components and two plastic components. Utilizing a glass lens nearest to the eye and a glass lens nearest to the display provides a robust seal for the optical module, and allows utilization of plastics for the two middle components to reduce the overall weight. Exposal of glass components in the air, instead of plastic components, protects the system from oxidization, aging caused by reaction with acid in the air, or scratches. The first plastic component would have a DOE replicated upon one of its two surfaces to correct chromatic and spherical aberrations. A second aspheric surface can be applied to the second plastic component to further help optimize performance without the need to add an additional element.

As a starting point to the design process, the Hideki Ogawa lens referenced in the PRIOR ART was considered which lens consists of an approximately 51.75 mm F/1.46 apochromatic double-Gauss lens with a two-layer diffractive surface on a plane-parallel substrate. The second surface of the plate component has a replicated DOE. Its full FOV is approximately 45.32 degrees.

In our approach, to reduce the number of elements to four, the plate just after the aperture, which had a DOE element, was removed from the original design, then the resultant form was scaled to approximately 23.92 mm focal length with a 10-mm entrance pupil, and a few cycles of optimization were executed to increase the half image size to approximately 16.75 mm in order to account for the size of the LCD image source. This process led to an optimized double-Gauss scaled starting point and its polychromatic diffraction MTF was found to provide acceptable performance as a starting point for the design.

Adopting a strategy of gradual simplification and accounting for the fact that a singlet lens with a DOE can replace the ftmctions of a doublet, the first glass doublet was replaced with a PMMA plastic singlet. Initial optimization was applied so that the second surface of the singlet was close to planar in order to replicate a DOE feature on the corresponding surface. A DOE feature with a spherical substrate was then designated to the second planar surface of the singlet. Further optimization was employed and led to a 5-component intermediary design. The MTF maintained more than approximately 40% at approximately 25 line pairs or cycles per mm resolution across the field of view, which led to a further simplification of the design. The next step was to replace the second doublet with a styrene plastic singlet with spherical surfaces. Initial optimization was applied and reached a 4-element design format.

Refer again to FIG. 2 for the showing of the final layout of the lens. As shown therein, singlet 509 has two spherical surfaces and is made of glass type SLAH55 (purchased from Ohara Inc.); singlet 510 has one spherical and one DOE surface and is made of plastic PMMA (polymethyl methacrylate); singlet 512 is a plastic lens made of polystyrene with an aspheric surface; singlet 513 is made of glass LAH58 (purchased from Ohara Inc.) with two spherical surfaces. The stop of the lens is located right after the second element and imaged to the pupil of the user's eye.

The main constraints utilized during the conceptual design included a control of the effective focal length, field weights, and optical power on the DOE.

Figure 3:
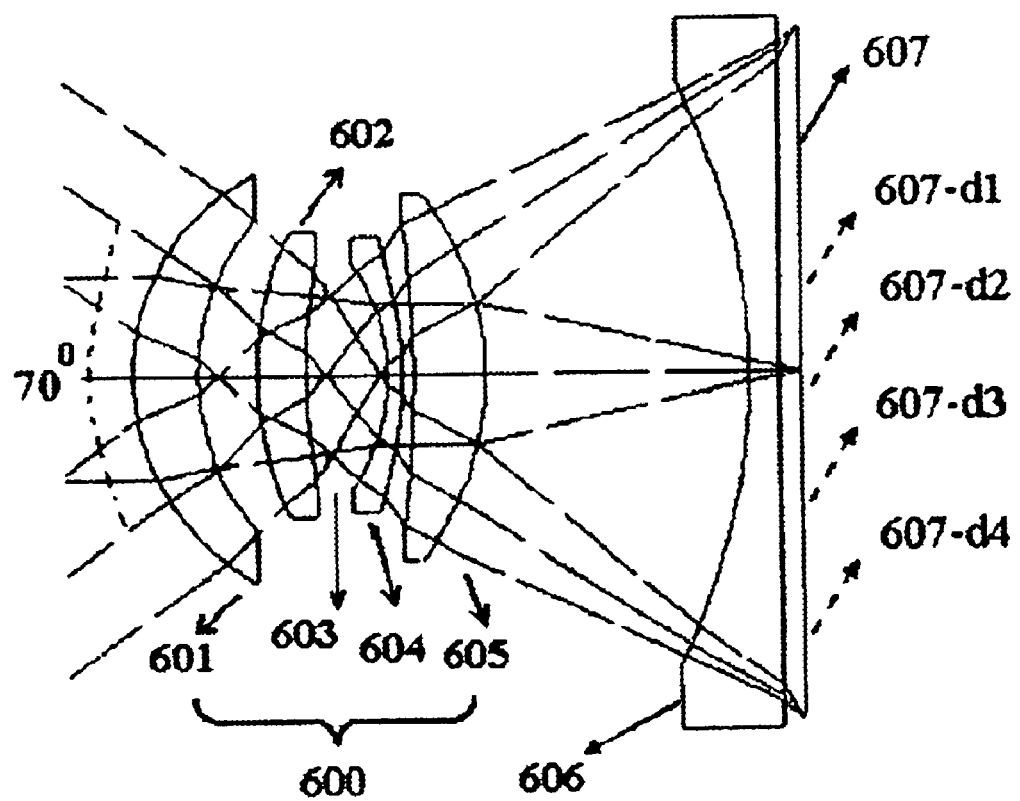
FIG. 3 shows another extension configuration of the novel double-Gauss lens with a field lens near the miniature display to minimize field curvature.

FIG. 3 illustrates in cross-section an important configuration which enhances the properties of the novel lens 600 with its surprising increase in FOV as disclosed herein with its single lens 601, the single plastic lens with one diffractive surface 602, the stop surface 603, the single plastic lens with one aspheric surface 604, and single lens 605. It appears that when a field lens 606 is combined with the novel lens 600 as illustrated in FIG. 3 by placing it adjacent to the miniature flat panel display 607, there is a minimization of the field curvature and an improvement of image quality. The field lens or field flattener 606 could be the same size as the miniature display 607 and be separated from the main projection lens assembly 600. Many types of miniature flat panel displays 607 can be utilized which are illustrated by the following electronic devices including but not limited to (as shown on FIG. 3) a liquid crystal display (LCD) 607-$d1$, an organic light emitting diode (OLED) display 607-$d2$, a liquid crystal on silicon (LCOS) display 607-$d3$ and a cathode-ray tube (CRT) 607-$d4$.

DOE Design Configuration

This section will concentrate on the various considerations for the DOE design, including selection of physical forms, optical power, substrate, phase function, and depth. profile for fabrication considerations.

Typically, there are four physical forms of DOEs: zone plate, binary optics, photo-etched multi-level DOE, and Kinoform DOE. The latter kinoform DOE was selected because it is usually fabricated by diamond turning techniques that can cut the substrate shape and the DOE profile at the same time. Therefore, the substrate shape of a Kinoform DOE can be spherical, planar being a special case, or aspheric. Non-planar substrates provide more flexibility on higher-order aberration correction without increase in cost. DOEs can be viewed as a material with large dispersion but opposite in sign to conventional materials (i.e. the V-number of a DOE is approximately −3.5 for the visible spectrum). For monochromatic applications, DOEs are typically designed to have significant optical power and can be viewed as replacements for refractive optics.

However, for polychromatic applications, in which case this application belongs, DOEs are typically designed to have small optical power and their primary purpose is to minimize and balance residual optical aberrations, especially to obtain achromatization in combination with refractive elements. The commonly used diffraction orders are 0, +1 or −1. The +1 order of diffraction was adopted.

While the substrate of the Kinoform can be spherical or aspheric, its curvature is required to be small enough for the fabrication of DOE features. The design further required an aspheric substrate to correct the higher order aberrations in a four-element system.

The periodic grating feature of the DOE is defined by a phase function. For fabrication, the phase function is transformed into a depth profile to define the feature parameters. The DOE grating features can be specified by the feature depth, the radii of the zone transitions, the size of the zones and the number of zones. DOE manufacturers recommend a limit on the minimum zone size. For example, our manufacturer recommended that the minimum zone size be no smaller than approximately 15 um. In the final design the radius of the DOE element $r_{max}$ is approximately 4.6 mm, the depth period d is approximately 1.12 um for an approximately 550 nm wavelength, the minimum feature size is approximately 25 um, and the number of zones is approximately 84.

Optimization

The system was optimized with rays traced from the pupil to the miniature display, for a full un-vignetted approximately 10-mm pupil, and a circular FOV of approximately 70 degrees (an increase of over thirty percent over the lens disclosed in the aforesaid U.S. patent application Ser. No. 10/090,070). The design is rotationally symmetric, requiring optimization only over half the FOV in one radial direction. During the process of optimization, all the curvatures of the refractive surfaces, the distance between two adjacent surfaces, the coefficients of the aspheric substrate and the DOE phase function, were set as variables. The effective focal length was constrained to be approximately 23.92 mm. The thickness of the components and the space among them were bounded. The total thickness of the system was restricted in the last stage of the optimization for the sake of compactness. Five visual fields, approximately 0, approximately 0.3, approximately 0.5, approximately 0.7, and approximately 1.0, (i.e. on axis, approximately 12, approximately 19, approximately 26 and approximately 35 degrees, respectively) were optimized. The weighting of the five fields were adjusted during the process of the optimization. The final weighting was approximately 1.0, approximately 0.8, approximately 0.7, approximately 0.5, and approximately 0.4, for each respective field.

During the final optimization stage, an aspheric surface was added to the first surface of the third element to balance the aberrations and improve performance. Performance evaluation Since the improved axial performance of the design depends on the DOE surface, it is important to evaluate the diffraction efficiency of the DOE. Various performance measures will be presented. At least three essential potential optical limitations encountered in HMDs must be assessed: field curvature (defocusing across the FOV); astigmatism; and, for color displays, transverse chromatic smear.

a). DOE Diffraction Efficiency

Figure 5A:
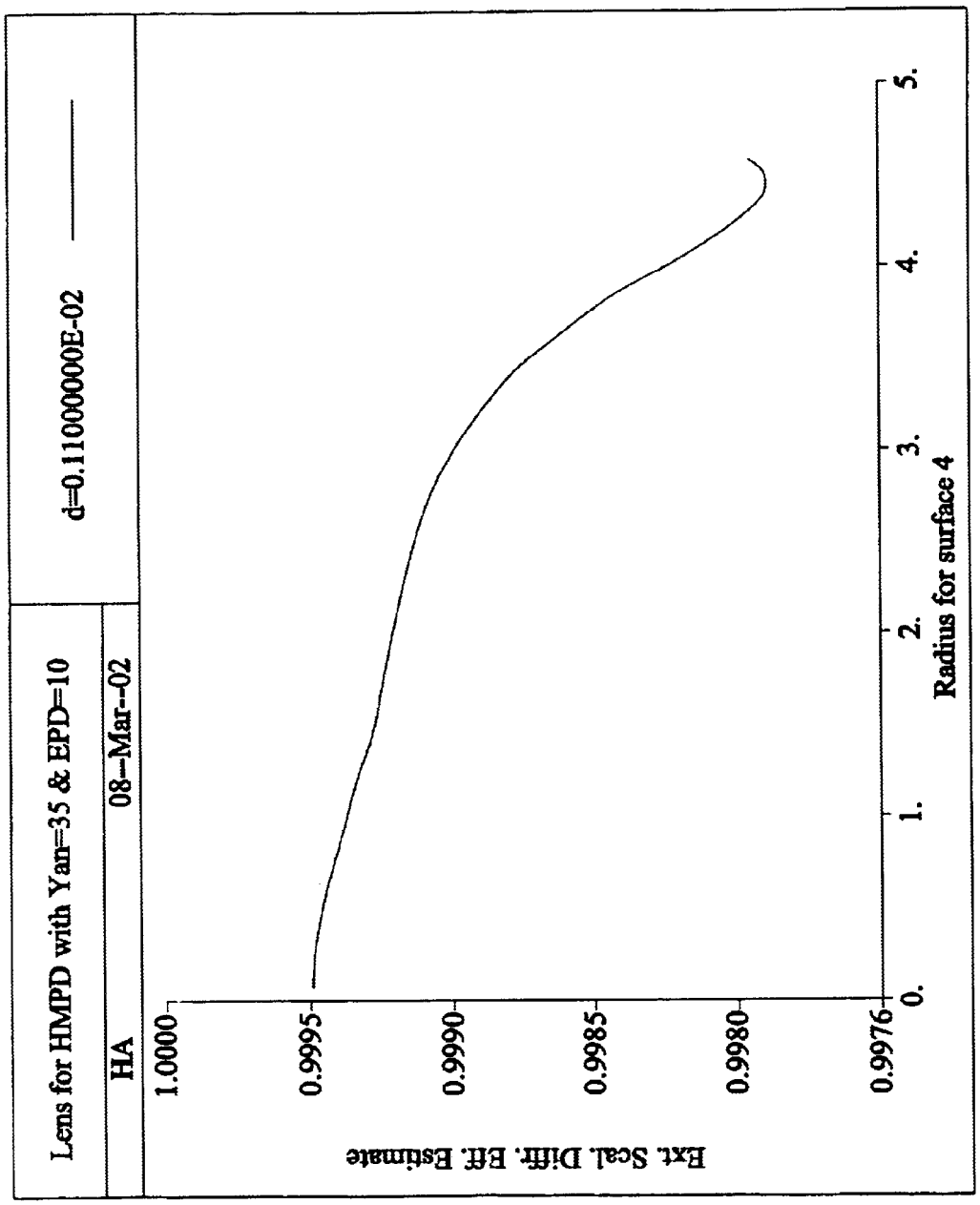
FIG. 5(a) shows diffraction efficiency across the radius for the designed wavelength for the diffractive optical element.
Figure 5B:
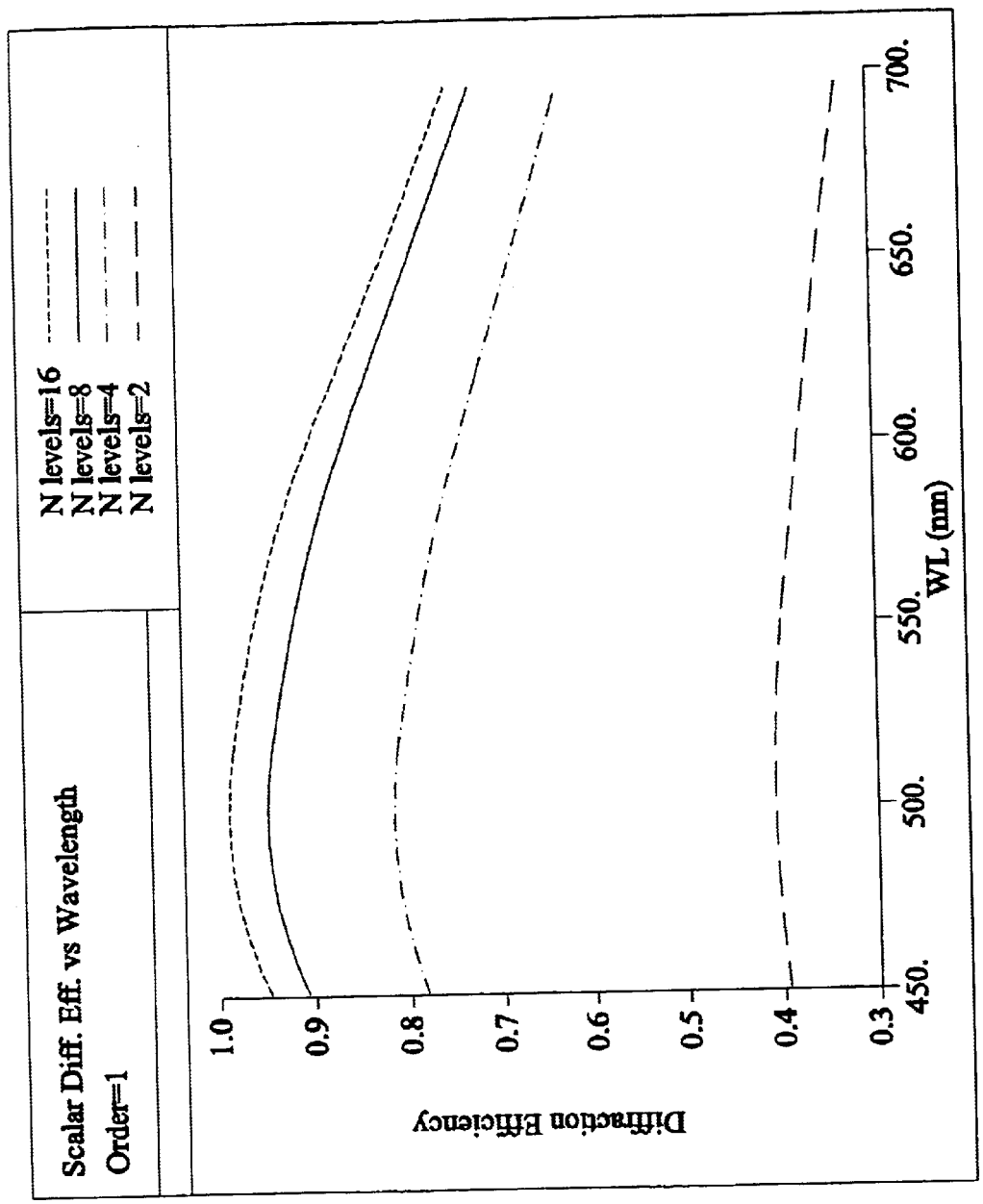
FIG. 5(b) shows diffraction efficiency as a function of the wavelength for the diffractive optical element.

As predicted by rigorous vector diffraction efficiency, the diffraction efficiency of DOE drops down as its features gets finer near the edge. The relationship of the diffraction efficiency across the radius for the designed wavelength (i.e. 550 nm) is shown in FIG. 5($a$). Results show that there is slight decrease across the radius but the variation is extremely small, ranging from approximately 0.9995 to approximately 0.9980. The diffraction efficiency is also wavelength dependent. The diffraction efficiency of the Kinoform DOE is predicted by using large number of masks, for example, 16 levels of binary masks. FIG. 5($b$) shows the relationship of the diffraction efficiency as a function of the wavelength. Results show that the efficiency variation ranges from approximately 80% to close to approximately 100% for the visible spectrum. b) Performance in object space In this section, the various optical performance of the optimized lens is assessed in object space across the five representative field angles for three wavelengths (approximately 656.3 nm, approximately 550 nm, and approximately 456.1 nm). An approximately 10-mm full size pupil is considered in object space. The spot diagrams demonstrate the overall high performance of the design, where the maximum RMS spot diameter is approximately 0.03 mm, which is smaller than the pixel size (i.e. approximately 0.042 mm) of the LCD display.

Figure 4A:
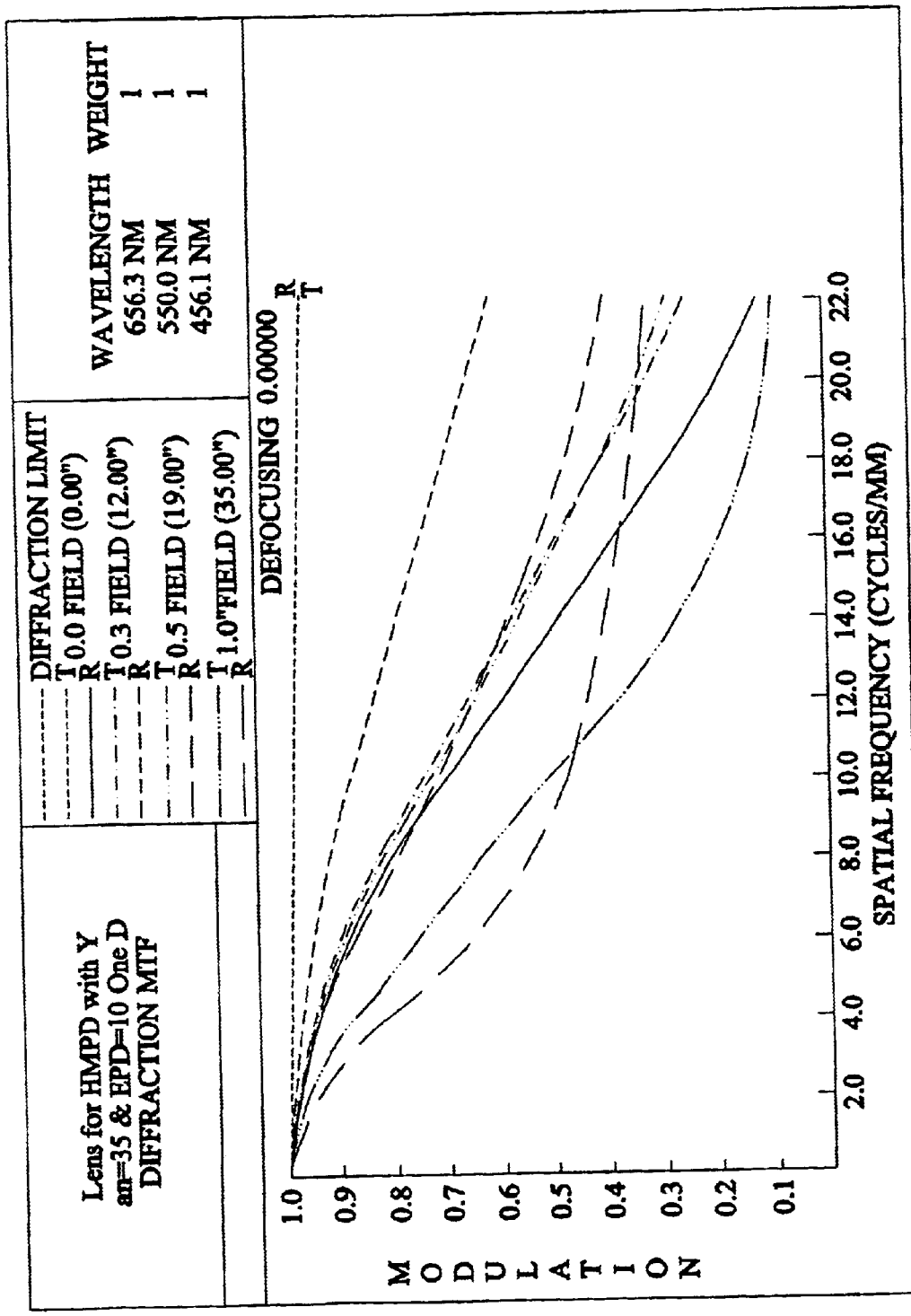
FIG. 4(a) shows the polychromatic modulation transfer function (MTF) performance of the lens profiled in FIG. 2 for a 10 mm pupil size.
Figure 4B:
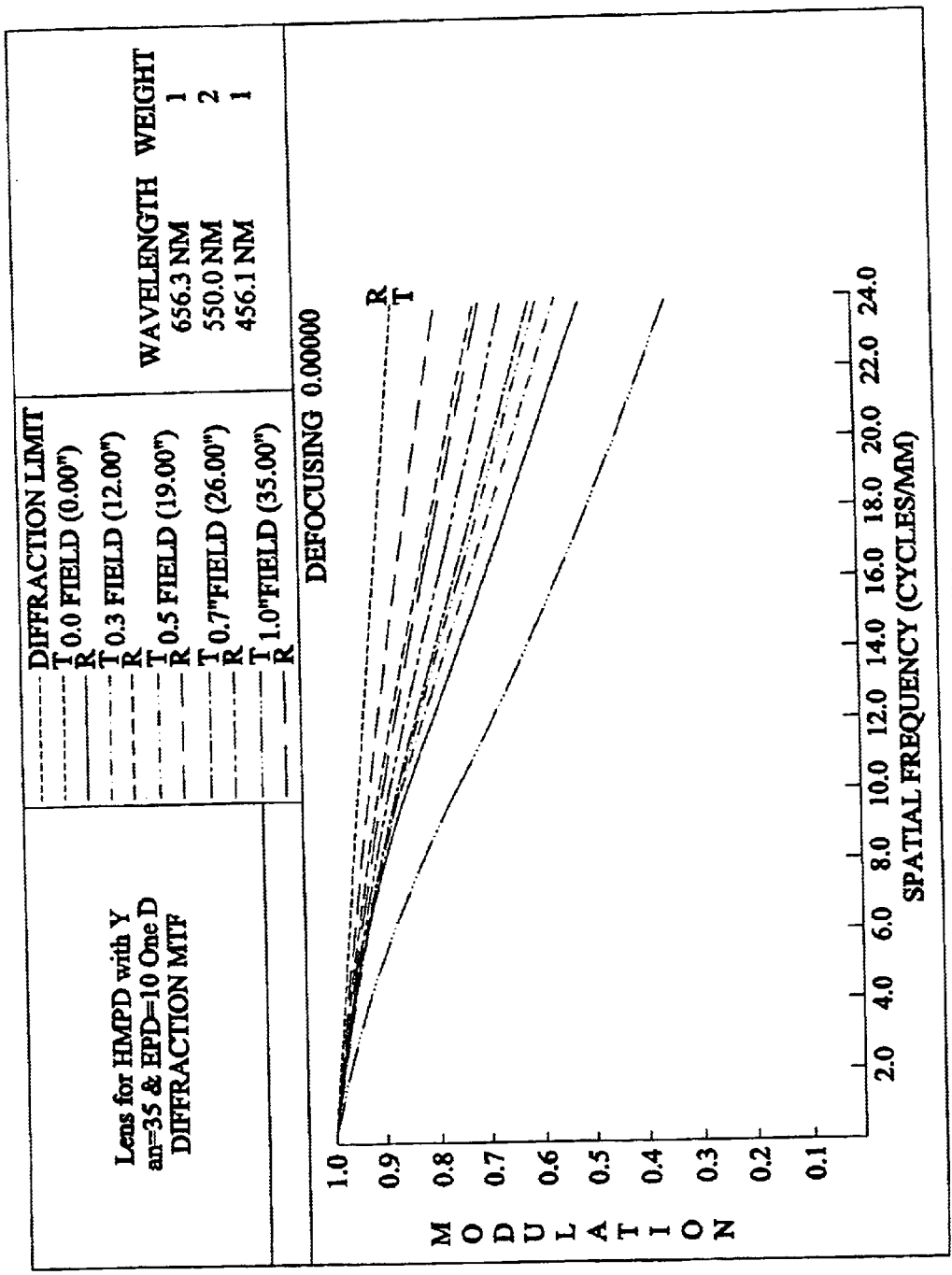
FIG. 4(b) shows the polychromatic modulation transfer function (MTF) performance of the lens profiled in FIG. 2 for a 3 mm human eye pupil size.
Figure 6:
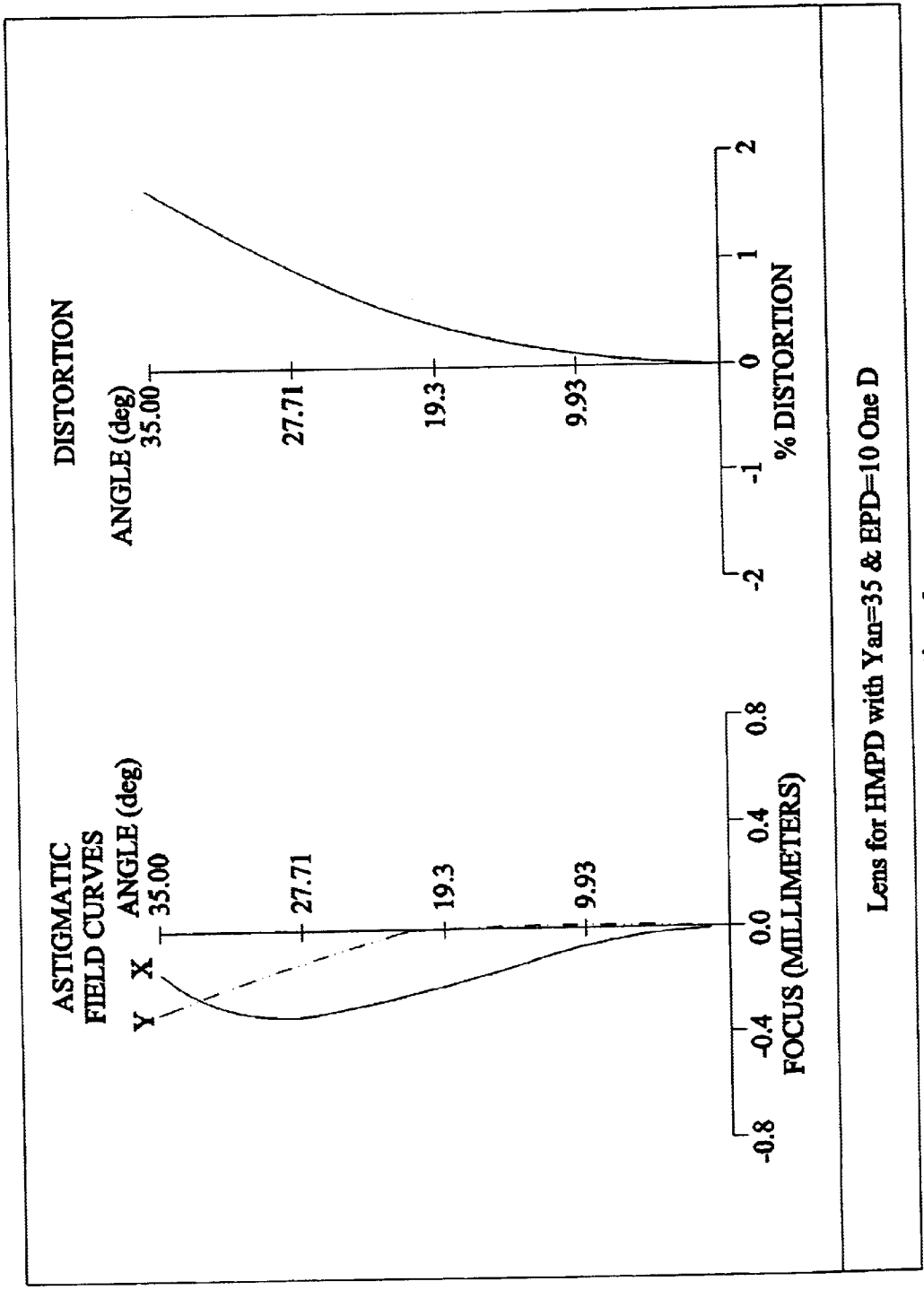
FIG. 6 shows the astigmatism and distortion curves of the novel double-Gauss lens of the invention.

The primary aberrations, including, astigmatic field curves and distortion are shown in FIG. 6 for an approximately 10-mm pupil. The distortion of the system is well corrected and is less than approximately 2% across the overall FOV. The polychromatic diffraction MTF for the fill approximately 10-mm pupil is presented across the five representative field angles, shown in FIG. 4(a) and the MTF for an approximately 3-mm pupil is also presented shown in FIG. 4(b).

TABLE 1

Optical lens specification

| Parameter | Specification |
| --- | --- |
| Object: Color LCD | |
| a. Size | 1.3 inch in diagonal |
| b. Active display area | Rectangle, 26.4 mm × 19.8 mm |
| c. Resolution | 640 × 480 pixels |
| Lens: | |
| a. Type | Projection lens |
| b. Effective focal length | 23.9 mm |
| c. Exit pupil diameter | 10 mm |
| d. Eye relief | 25 mm |
| e. No. of diffractive surface | 1 |
| Other Parameters: | |
| Wavelength range | 656 to 486 nm |
| FOV | 70.0° in diagonal |
| Distortion | <2.0% over entire FOV |

The target LCD display has a spatial frequency of approximately 241 p/mm, given an approximately 42-um pixel size. The modulation ratio of the presented design with approximately 3-mm pupil is more than approximately 40% across the overall fields at approximately 241 p/mm. Therefore, the lens design does not limit the system resolution.

The head-mounted projective display (HMPD) is based on novel innovative technology when one uses the compact lens of the invention for 3D visualization. The HMPD main advantages include the capabilities of: 1) achieving a larger FOV and easier correction of optical distortion than conventional eyepiece-based optical see-through HMDs; 2) allowing correct occlusion of virtual objects in augmented environments; 3) projecting undistorted images on curved surfaces at arbitrary position; and, 4) creating independent viewpoints without crosstalk in multi-user environments.

The foregoing discussion of the COMPACT LENS of the invention has reduced weight and markedly increase of FOV and additional useful properties as a projection lens and as an assembly for the teleportal augmented reality system by using the combination of diffractive optical element (DOE), plastic components and aspheric surfaces for generating a new generation of HMPDs which have been integrated with the novel lens.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A compact lens assembly comprising:
    a positive convex-concave singlet lens;
    a plastic singlet lens adjacent to the positive lens, having one face being an aspheric substrate plus a diffractive optical surface;
    a mid-located stop/shutter positioned adjacent to the singlet lens;
    a plastic singlet negative lens with an aspheric surface on one of the faces adjacent to the stop/shutter;
    a glass singlet lens adjacent to the negative lens; and,
    said lens having a focal length less than about 35 mm whereby its field of view (FOV) is greater than about fifty degrees and the combination of the plastic and glass lens allows for visible spectrum images without smears and with reduced weight.

2. The compact lens assembly of claim 1, wherein the assembly provides a FOV of about seventy degrees.

3. The compact lens assembly of claim 1, further comprising:
    a helmet for mounting the lens assembly thereon for a head mounted display.

4. The compact lens assembly of claim 3, wherein the lens assembly is mounted in duplicate on said helmet, whereby the display is in stereo.

5. The compact lens assembly of claim 1, further comprising:
    a light source combined with the assembly; and, said light source positioned to be beamed through said lens whereby said combination is used in projection lens applications.

6. A method of forming a compact lens display assembly comprising the steps of:
    (a) combining aspheric negative lenses with positive lenses;
    (b) combining said combined lens with additional diffractive optics;
    (c) further combining said combined lens with an additional field lens whereby full combination provides improved image quality; and
    (d) applying the compact lens display assemblv to a projection lens system whereby a FOV beyond about 70 degrees is obtained.

7. The method of claim 6, further comprising the step of:
    applying the compact lens display assembly to a head mounted display system.

8. The method of claim 6, wherein the first step of combining includes the step of:
    combining two aspheric plastic negative lenses with two positive glass lenses wherein
    the compact lens display consist of four element optics.

9. The method of claim 6, further comprising the step of:
    fitting the compact lens display assembly into a space having dimensions of
    approximately 26.4 mm by approximately 19.8 mm.

10. The method of claim 9, further comprising the step of:
    mounting the assembly in a head mount.

11. A four lens component compact lens assembly comprising in combination:
    a positive singlet first lens;
    a singlet second lens adjacent to the positive lens, having one face being an aspheric substrate plus a diffractive optical surface;
    a mid-located stop/shutter positioned adjacent to the singlet lens;
    a singlet negative third lens with an aspheric surface on one face of the lens;
    a singlet fourth lens adjacent to the third lens; and,
    a focal number (F) less than about 2.92 whereby a FOV greater than about 50 degrees is realized and allows for visible spectrum images without smears.

12. The assembly of claim 11, wherein the first lens includes:
    a convex-concave lens.

13. The assembly of claim 11, wherein the second and the third lens include:

plastic singlet lens.

14. The assembly of claim 11, wherein the fourth lens includes:

a glass lens.

15. The compact lens assembly of claim 11, wherein at least one of the first lens, the second lens, the third lens and the fourth lens includes:

a combination of a plastic lens and a glass lens.

16. The compact lens assembly of claim 11, wherein the assembly includes:

dimensions of approximately 15 mm by approximately 13.4 mm.

17. A four plastic-glass compact lens assembly suitable for HMPD applications comprising:

(a) in combination said compact lens assembly having a FOV greater than 50 approximately degrees;

(b) a miniature flat panel display, and, (c) a field lens added close to said miniature flat panel display and between said display and said assembly whereby there is an increase in the FOV of said combination.

18. The four plastic-glass compact lens assembly of claim 17, wherein said assembly has a FOV greater than about 70 degrees.

19. The four plastic-glass compact lens assembly of claim 17, wherein said combination has improved image quality.

20. The four plastic-glass compact lens assembly of claim 17, wherein said miniature flat panel display is selected from at least one of:

a liquid crystal display (LCD), an organic light emitting diode display (OLED), a liquid crystal on silicon (LCOS) display and a cathode-ray tube (CRT).

21. A method of forming a compact lens display assembly comprising the steps of:

(a) combining aspheric negative lenses with positive lenses;

(b) combining said combined lens with additional diffractive optics;

(c) further combining said combined lens with an additional field lens whereby full combination provides improved image quality; and (d) fitting the compact lens display assembly into a space having dimensions of approximately 26.4 mm by approximately 19.8 mm.

22. The method of claim 21, further comprising the step of:

mounting the assembly in a head mount.

23. The method of claim 21, wherein the first step of combining includes the step of:

combining two aspheric plastic negative lenses with two positive glass lenses whereein the compact lens display consist of four element optics.

* * * * *